United States Patent
Deshmukh et al.

(10) Patent No.: US 11,448,698 B1
(45) Date of Patent: Sep. 20, 2022

(54) ENABLING ISOLATED DEVELOPMENT MODE IN UTILITY END POINTS

(71) Applicant: LANDIS+GYR INNOVATIONS, INC., Alpharetta, GA (US)

(72) Inventors: Pushpesh Kumar Deshmukh, Alpharetta, GA (US); Stephen John Chasko, Marietta, GA (US); Damien Hugoo, Roswell, GA (US)

(73) Assignee: LANDIS+GYR INNOVATIONS, INC., Alpharetta, GA (US)

( * ) Notice: Subject to any disclaimer, the term of this patent is extended or adjusted under 35 U.S.C. 154(b) by 0 days.

(21) Appl. No.: 17/217,812

(22) Filed: Mar. 30, 2021

(51) Int. Cl.
*G01R 31/3185* (2006.01)
*H04L 9/08* (2006.01)
*H04L 9/32* (2006.01)

(52) U.S. Cl.
CPC ........ *G01R 31/318572* (2013.01); *G01R 31/318538* (2013.01); *G01R 31/318544* (2013.01); *H04L 9/0825* (2013.01); *H04L 9/3236* (2013.01); *H04L 9/3247* (2013.01)

(58) Field of Classification Search
CPC .... G01R 31/318572; G01R 31/318538; G01R 31/318544; H04L 9/0825; H04L 9/3236; H04L 9/3247
USPC ........................................ 714/727, 723, 742
See application file for complete search history.

(56) References Cited

U.S. PATENT DOCUMENTS

| 10,140,840 | B2 * | 11/2018 | Cohn | H04Q 3/0025 |
|---|---|---|---|---|
| 10,645,576 | B1 * | 5/2020 | Deshmukh | H04L 63/065 |
| 10,666,767 | B1 * | 5/2020 | Floyd | H04W 12/10 |
| 2019/0384916 | A1 | 12/2019 | Shah et al. | |
| 2020/0204346 | A1 | 6/2020 | Trevethan | |
| 2020/0358767 | A1 * | 11/2020 | Chasko | H04W 12/50 |
| 2020/0372154 | A1 * | 11/2020 | Bacher | H04L 41/147 |
| 2021/0044579 | A1 * | 2/2021 | Nelson-Gal | G06F 8/65 |
| 2021/0349449 | A1 * | 11/2021 | Wang | H04L 9/3221 |
| 2022/0131834 | A1 * | 4/2022 | Kleine | H04W 4/40 |
| 2022/0141036 | A1 * | 5/2022 | Jang | H04L 9/0825 |
| | | | | 713/176 |

FOREIGN PATENT DOCUMENTS

WO 2018229632 A1 12/2018

OTHER PUBLICATIONS

International Application No. PCT/US2022/022362, International Search Report and Written Opinion, dated Jul. 12, 2022, 13 pages.

* cited by examiner

*Primary Examiner* — John J Tabone, Jr.

(74) *Attorney, Agent, or Firm* — Kilpatrick Townsend & Stockton LLP

(57) ABSTRACT

Techniques are disclosed for software development on utility devices. In an example, a utility device, responsive to validating a manufacturer signature, transitions to an isolated development mode. When in the isolated development mode, the utility device is restricted from joining a network and receives an application from a development computing system. The utility device validates a network signature and transitions to a network testing mode. When in the network testing mode, the utility device joins the network, registers with a head end system via the network, and executes the application. After a threshold amount of time has lapsed the utility device transitions to the isolated development mode.

20 Claims, 5 Drawing Sheets

ENABLING ISOLATED DEVELOPMENT MODE IN UTILITY END POINTS

TECHNICAL FIELD

This invention relates generally to resource distribution systems and more specifically to software development of applications that execute on utility devices within a resource distribution system.

BACKGROUND

Modern resource distribution systems use networks of interconnected utility devices (such as utility meters) to collect consumption and other data and propagate the data to a central system for billing and other purposes. Each utility device is typically connected to a communications network (e.g., a wireless mesh network). In some cases, a utility device can execute custom application software.

SUMMARY

Certain aspects and features include techniques for software development of applications that execute on utility devices such as utility meters. In an aspect, a utility device includes one or more processors. The utility device is configured to operate in one or more of: an endpoint mode, an isolated development mode, and a network testing mode. When in the endpoint mode, the utility device is configured to communicate with other devices on a network. When in the endpoint mode, the utility device is further configured to access a manufacturer signature and a network signature. When in the endpoint mode, the utility device is further configured to validate the manufacturer signature against a reference manufacturer signature. When in the endpoint mode, the utility device is further configured to, responsive to validating the manufacturer signature, transition to the isolated development mode. When in the isolated development mode, the utility device is restricted from joining the network and is configured to receive, via a development port, an application from a development computing system. When in the isolated development mode, the utility device is further configured to execute the application on the one or more processors. When in the isolated development mode, the utility device is further configured to validate the network signature against a reference network signature. When in the isolated development mode, the utility device is further configured to, responsive to validating the network signature, transition to the network testing mode. When in the network testing mode, the utility device is further configured to join the network. When in the network testing mode, the utility device is further configured to register with a head end system via the network. When in the network testing mode, the utility device is further configured to execute the application on the one or more processors. The utility device communicates with one or more other utility devices based on the application. When in the network testing mode, the utility device is further configured to, after a threshold amount of time has lapsed, transition to the isolated development mode.

In another aspect, a method involves transmitting a request for a development certificate. The request includes a unique identifier of a utility device. The method further involves receiving a manufacturer signature and a network signature. The method further involves validating the manufacturer signature against a reference manufacturer signature. The method further involves, responsive to validating the manufacturer signature, transitioning to an isolated development mode. When in the isolated development mode, the method further involves restricting the utility device from joining a network. When in the isolated development mode, the method further involves receiving an application from a development computing system. When in the isolated development mode, the method further involves executing the application. When in the isolated development mode, the method further involves validating the network signature against a reference network signature. When in the isolated development mode, the method further involves, responsive to validating the network signature, transitioning to a network testing mode. When in the network testing mode, the method further involves, joining a network and communicating with one or more utility devices connected to the network. When in the network testing mode, the method further involves registering with a head end system via the network. When in the network testing mode, the method further involves executing the application. The application can communicate with the one or more utility devices. When in the network testing mode, the method further involves, after a threshold amount of time has lapsed, transitioning to the isolated development mode.

In another aspect, a system includes a development computing system and a utility device. The development computing system is configured to transmit, to a validation server, a request for a development certificate. The request includes a unique identifier of a utility device. The development computing system is configured to receive, from the validation server, the development certificate. The development certificate includes a network signature and a manufacturer signature. The development computing system is further configured to transmit the development certificate and an application to the utility device. The utility device includes one or more processors and a memory configured to store a reference manufacturer signature and a reference network signature. The utility device is further configured to communicate with the development computing system and operate in one or more of: an endpoint mode, an isolated development mode, or a network testing mode. When in the endpoint mode, the utility device is configured to communicate with other devices on a network. When in the endpoint mode, the utility device is configured to receive the development certificate from the development computing system. When in the endpoint mode, the utility device is configured to validate the manufacturer signature against the reference manufacturer signature. Responsive to validating the manufacturer signature, the utility device is configured transition to the isolated development mode. When in the isolated development mode, the utility device is restricted from joining a network and is configured to execute the application on the one or more processors. When in the isolated development mode, the utility device is configured to validate the network signature against the reference network signature. When in the isolated development mode, the utility device is configured to, responsive to validating the network signature, transition to the network testing mode.

These illustrative examples are mentioned not to limit or define the disclosure, but to provide examples to aid understanding thereof. Additional examples and further description are provided in the Detailed Description.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Disclosed solutions relate to the development, debugging, testing, and deployment of application software on utility devices (e.g., utility meters) within a resource distribution network. Examples of resource distribution networks are utility networks such as electric, gas, or water distribution networks. Examples of functions that can be performed by application software include testing for line faults, determining line loss, checking for safety issues, smart metering applications, and smart grid applications.

Resource distribution networks include utility devices that measure parameters such as resource consumption or status of a resource. Devices on resource distribution networks are typically connected by one or more communications networks, which provide a mechanism by which data can be aggregated and passed to a central system, for example, for billing purposes or analytics.

Application software may be developed for and deployed onto a utility device, but security concerns exist due to the nature of a utility communications network. For instance, because application software executing on a utility device may have access to a utility network, a poorly or maliciously written application may cause reliability issues for the utility network. Such risks may not be tolerated because of the safety and public utility requirements of a utility system. Disclosed solutions mitigate these risks by facilitating application software development and testing in a secure, limited manner, prior to widespread deployment of the application.

Further, facilitating secure application software development on utility devices can facilitate advanced applications that were previously impractical. For instance, an application operating on a utility device located downstream from a transformer can make high-frequency measurements to determine whether an excessive amount of line loss is occurring. But due to bandwidth and power limitations of utility networks, propagating these measurements sufficiently quickly to a head end system can be challenging. Accordingly, enabling applications to operate within a local area on a network can improve analytical capabilities.

In a more specific example, disclosed solutions facilitate secure software development on utility devices deployed within a utility system. Disclosed solutions enable development and testing capabilities in a limited environment by validating one or more certificates or signatures from a manufacturer of the utility device and/or a utility network operator.

Figure 1:
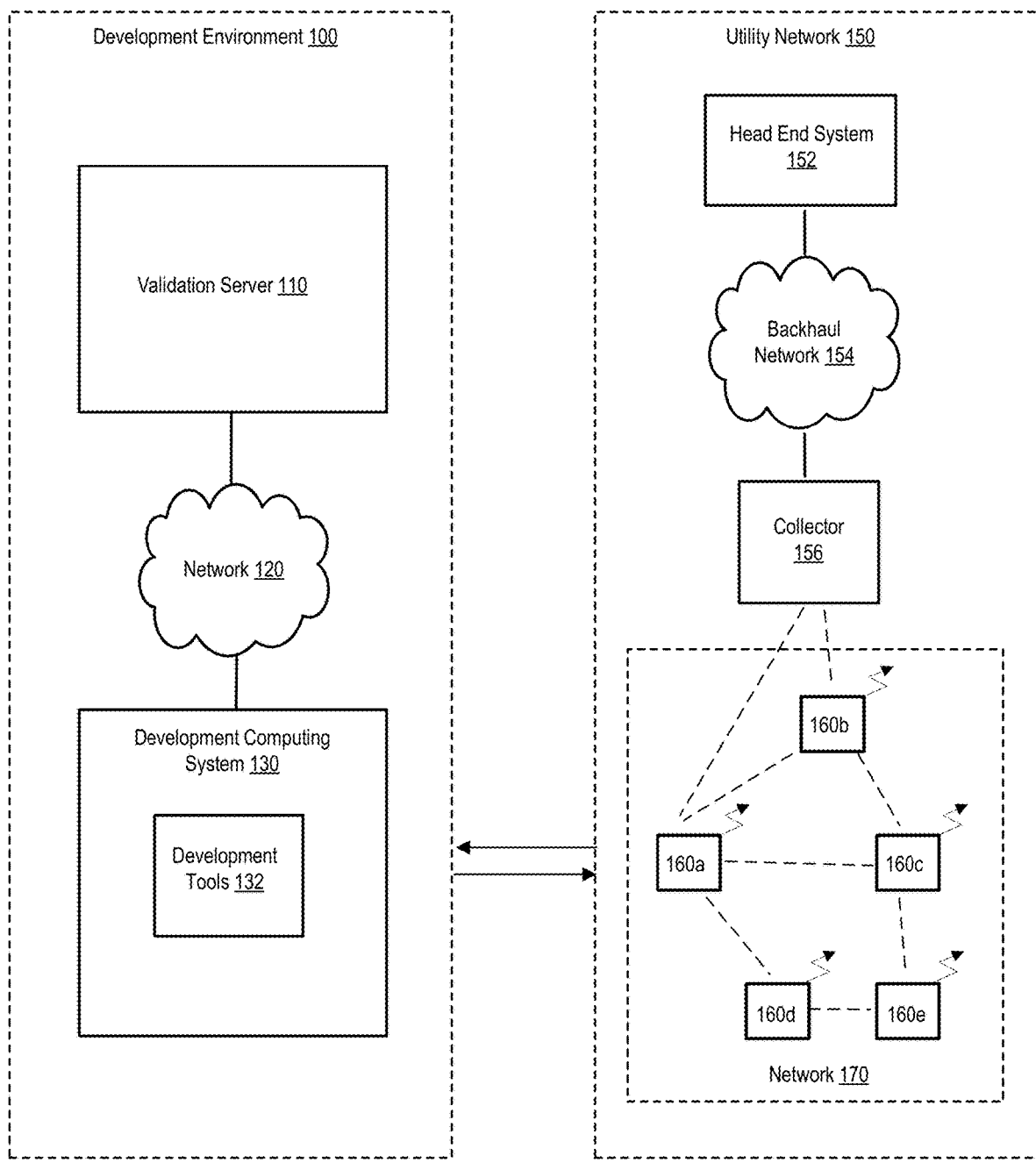
FIG. 1 illustrates a development environment for a utility device within a utility network, in accordance with an aspect.

Turning now to the Figures, FIG. 1 illustrates a development environment for a utility device within a utility network, in accordance with an aspect. FIG. 1 depicts development environment 100 and utility network 150. Development environment 100 includes validation server 110, network 120, and development computing system 130. In the example depicted by FIG. 1, a validation server 110 validates a utility device on utility network 150, thereby enabling development and/or testing functionality of the utility device. The capabilities of utility devices on utility network 150 can therefore be limited by permissions granted by the validation server 110. Permissions can be granted by receiving a development certificate, which can include one or more signatures. For example, a manufacturer signature represents permissions granted by the manufacturer of the utility device and a network signature represents permissions granted by an operator of the utility network.

To facilitate development and testing, a given utility device can be granted permission to operate in different modes, each mode having different sets of capabilities and limitations. Examples of modes include: an endpoint mode, an isolated development mode, and a network testing mode. Transitioning between or access to the modes can be predicated upon a successful validation of a utility device by the manufacturer of the device and/or the utility operating the utility network. These modes are explained further with respect to FIG. 2 and an example of a process of transitioning between modes is described in FIG. 3.

Development computing system 130 is configurable to download, debug, test, and cause the execution of application software on one or more utility devices. For instance, using development tools 132, a development can build (compile, assemble, link, etc.) a software application into object files, download the object files via a development port to a utility device, and step through the application. An example of development tools 132 is an integrated development environment (IDE).

Utility network 150 includes one or more of head end system 152, backhaul network 154, collector 156, and network 170. Head end system 152 communicates via backhaul network 154 to the collector 156. Backhaul network 154 can be a wired network (e.g., Ethernet or fiber optic cable), a wireless network (e.g., cellular), or a combination of both. While utility devices may be located at an end user premises, a topology of a communications network including utility devices is fundamentally different from a topology of the resource distribution network itself, as a communications network is structured based on connectivity between devices rather than a flow of the resource.

Network 170 can be a personal area network (PAN). A PAN may be a wireless network or a wireless mesh network that uses a wireless protocol, such as the WiFi, Bluetooth, Wireless Smart Utility Network (Wi-SUN), ZigBee, and Institute of Electrical and Electronics Engineers (IEEE) 802.15 protocols or a proprietary protocol. Collector 156 communicates with network 170. If network 170 is a PAN, then collector 156 can be PAN coordinator for network 170. Collector 156 communicates with utility devices 160a-e. Each utility device can communicate wirelessly with one or more other devices across one or more PANs. While network 170 includes five utility devices for illustration purposes, any number of utility devices is possible. For instance, network 170 can include hundreds of utility devices. There can exist one or more different communication paths between utility devices 160a-e and collector 156.

Utility devices 160a-e are generally utility meters located at end user premises (e.g., at a point of service), but can also include other measurement or control devices connected to power lines, transformers, capacitor banks, and so forth. A utility device can include one or more computing systems. Therefore, utility devices can implement functionality such as Advanced Metering Infrastructure (AMI) functionality, which can include capturing, processing, and transmitting metering and resource information.

Each utility device 160a-e can execute firmware and software applications. The firmware can include basic operating functionality such as an operating system, software drivers for the various peripherals on a utility device, and so forth. Each utility device may include one or more applications pre-installed from the manufacturer or from the utility network operator.

Application software may be tested and debugged when the target hardware is operating within an isolated development mode in which network and other connectivity is limited. Further, in a network testing mode, more extensive testing can be performed as compared to the isolated development mode, while still maintaining somewhat limited capabilities over the utility network and/or for a limited amount of time as compared to a default mode.

Figure 2:
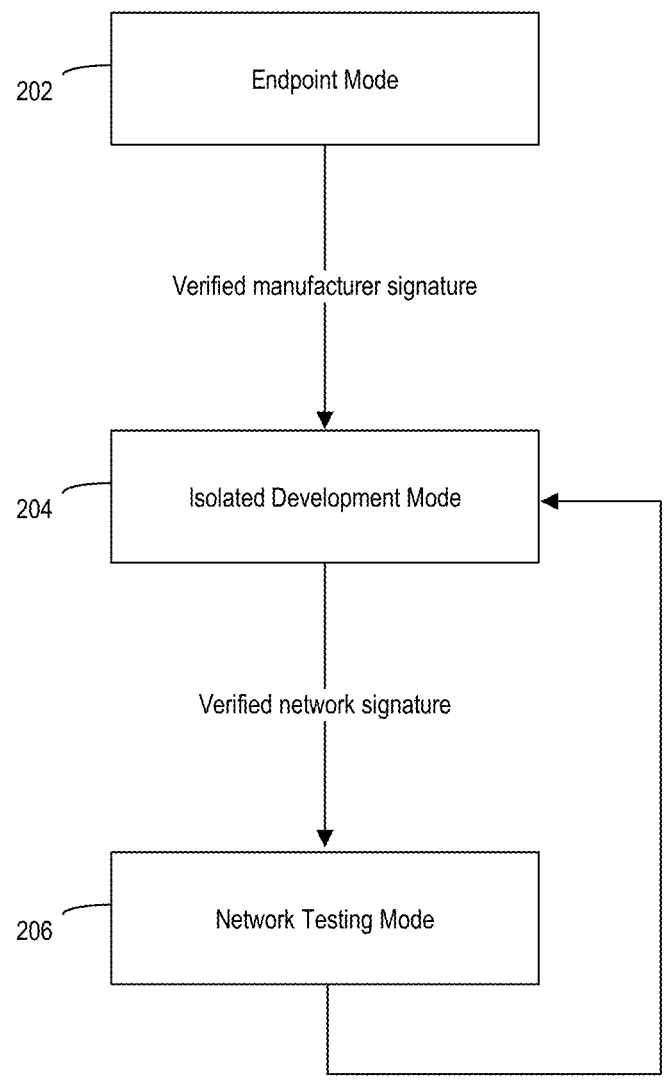
FIG. 2 illustrates an exemplary state diagram of a utility device, in accordance with an aspect.

FIG. 2 illustrates an exemplary state diagram 200 of a utility device, in accordance with an aspect. FIG. 2 depicts endpoint mode 202, isolated development mode 204, and network testing mode 206. While three modes are listed, more than three modes are possible. For example purposes, FIG. 2 is discussed with respect to utility device 160a.

In an aspect, utility device 160a enters endpoint mode 202 when powering on. When in endpoint mode, utility device 160a operates with a default set of functionality required to operate within a utility network. For instance, utility device 160a may join a network, communicate across a network, register with a head end system, and so forth. Utility device 160a may gather and transmit metering data, perform analytics, and execute any approved or manufacturer-installed application software. In some cases, in endpoint mode 202, any diagnostic or development, e.g., Joint Test Action Group (JTAG), ports of utility device 160a may be disabled to prevent software development or tampering.

To transition from endpoint mode 202 to isolated development mode 204, a manufacturer signature is obtained and validated. The manufacturer signature ensures that the utility device has permission from the manufacturer to debug and test the application software. Development computing system 130 can facilitate the transition by performing operations such as requesting a unique key from the utility device and transmitting the unique key to validation server 110. The validation process is explained further with respect to FIGS. 3 and 4.

Once in isolated development mode 204, the utility device is subject to the restrictions in functionality. Examples of restrictions include limited or no network access, (e.g., network 170), limited or no access to head end system 152. One or more ports such as JTAG ports or diagnostic ports on the utility device can be enabled to facilitate access to the utility device by the development tools. In some cases, communication between utility devices can still occur over non-disabled communication ports, such as via a serial port and a switch.

In isolated development mode 204, because network and other functionality is limited, an application program being tested or debugged cannot cause damage to the network at large. Accordingly, application software debugging and testing can take place without a risk of causing damage to the network or other devices or interfering with the functionality of the network (e.g. the collecting and transmission of metering or status data).

When in isolated development mode 204, utility device 160a can be controlled by the development computing system 130 and the development tools 132. Development tools 132 can download one or more application programs to utility device 160a. Development tools 132 can also control utility device 160a using commands such as debug, step (through code), trace, and so forth.

To transition from isolated development mode 204 to network testing mode 206, a network signature is obtained from a server. The network signature indicates that the utility device has permission from the utility network operator to perform testing of application software. A request for a certificate or signature can be made by utility device 160a and/or development tools 132. In some cases, the utility network operator sends a unique identifier of utility device 160a to the manufacturer. Based on the unique identifier and in some cases additional parameters such as device type or configuration, the manufacturer transmits the manufacturer signature and network signature to the utility device 160a. The validation process is explained further with respect to FIGS. 3 and 4.

In network testing mode 206, utility device 160a can join a network, for example to enable limited testing of a software application, but utility device 160a is still subject to limits relative to endpoint mode. When in network testing mode 206, some restrictions present in isolated development mode 204 may be removed. For instance, utility device 160a may join a network and register with a head end system.

In some cases, access to network testing mode 206 can be time-restricted. For example, after a time period, the utility device can automatically transition back to isolated development mode 204. Examples of time periods include 1 day or 7 days. The time periods can be preconfigured and/or adjusted. From endpoint mode 202, the utility device can transition back to endpoint mode after a threshold amount of time has lapsed or after the development computing system 130 sends a control signal to the utility device. In some cases, the utility device can transition back to endpoint mode 202, for example, after a replacement of the firmware of the utility device and/or a change in parameters of the utility device.

The restrictions implemented in isolated development mode and network testing mode can be implemented in various ways. For example, in one implementation, to transition from endpoint mode 202 to isolated development mode 204 and/or isolated development mode 204 to network testing mode 206, utility device 160a reboots into a restricted state controlled by the firmware of utility device 160a. In other cases, a reset in combination with an application of a set of parameters of the utility device is used to implement the restrictions.

Network access restrictions can be implemented by the utility device (e.g., in the firmware) such that the network adaptor is disabled or restricted or by the network itself. For instance, the serial or network identifier of the utility device can be masked in software such that the utility device is not able to join the network. In another example, the network itself can refuse access to the utility device based on the head end system sending a command with the identifier of the utility device and causing the network to add the identifier onto a restricted access list.

Figure 3:
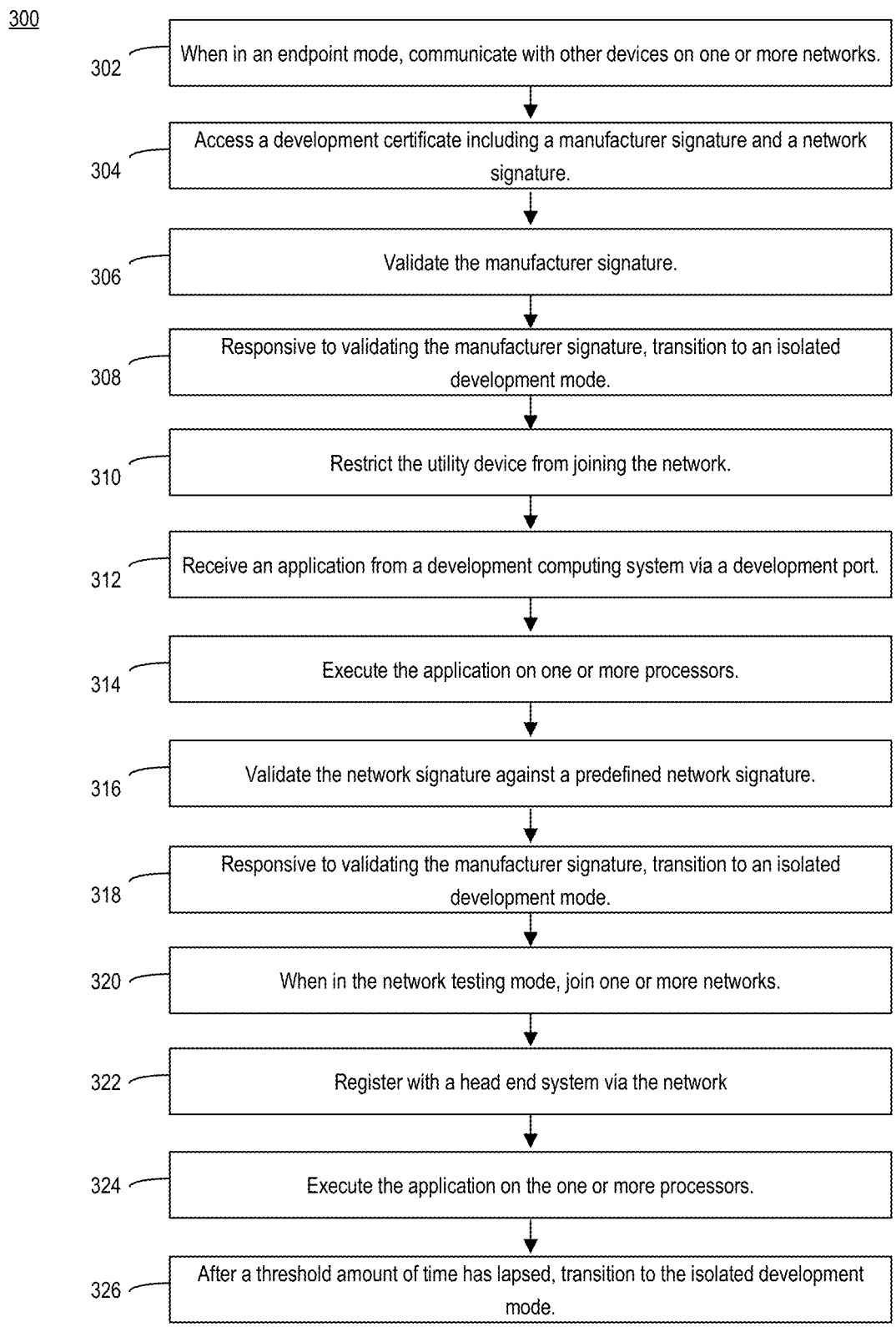
FIG. 3 is a flowchart illustrating an exemplary process for operating a utility device for development, in accordance with an aspect.

FIG. 3 is a flowchart illustrating an exemplary process for operating a utility device for development, in accordance with an aspect. It will be appreciated that the operations described in process 300 can be performed in a different order and/or one or more operations of process 300 need not be performed.

For example purposes, process 300 is described as performed by development environment 100 (e.g., development computing system 130) and utility network 150 (e.g., utility device 160*a*). Process 300 involves three modes: endpoint mode, isolated development mode, and network testing mode.

At block 302 of process 300, when in an endpoint mode, the utility device communicates with other devices on one or more networks. For instance, when in the endpoint mode, utility device 160*a* is configured to communicate with other utility devices 160*b-e*, network 170, collector 156, and head end system 152 via backhaul network 154. In endpoint mode, the development port and/or other ports on utility device 160*a* may be disabled for security reasons.

At block 304 of process 300, the utility device accesses a development certificate including a manufacturer signature and a network signature. Utility devices 160*a* receives the development certificate, either via development computing system 130 (e.g., over a development port connected to the utility device 160*a*) or via the utility network 150 (e.g., via network 170 via collector 156 to backhaul network 154 and over backhaul network 154 to head end system 152).

Figure 4:
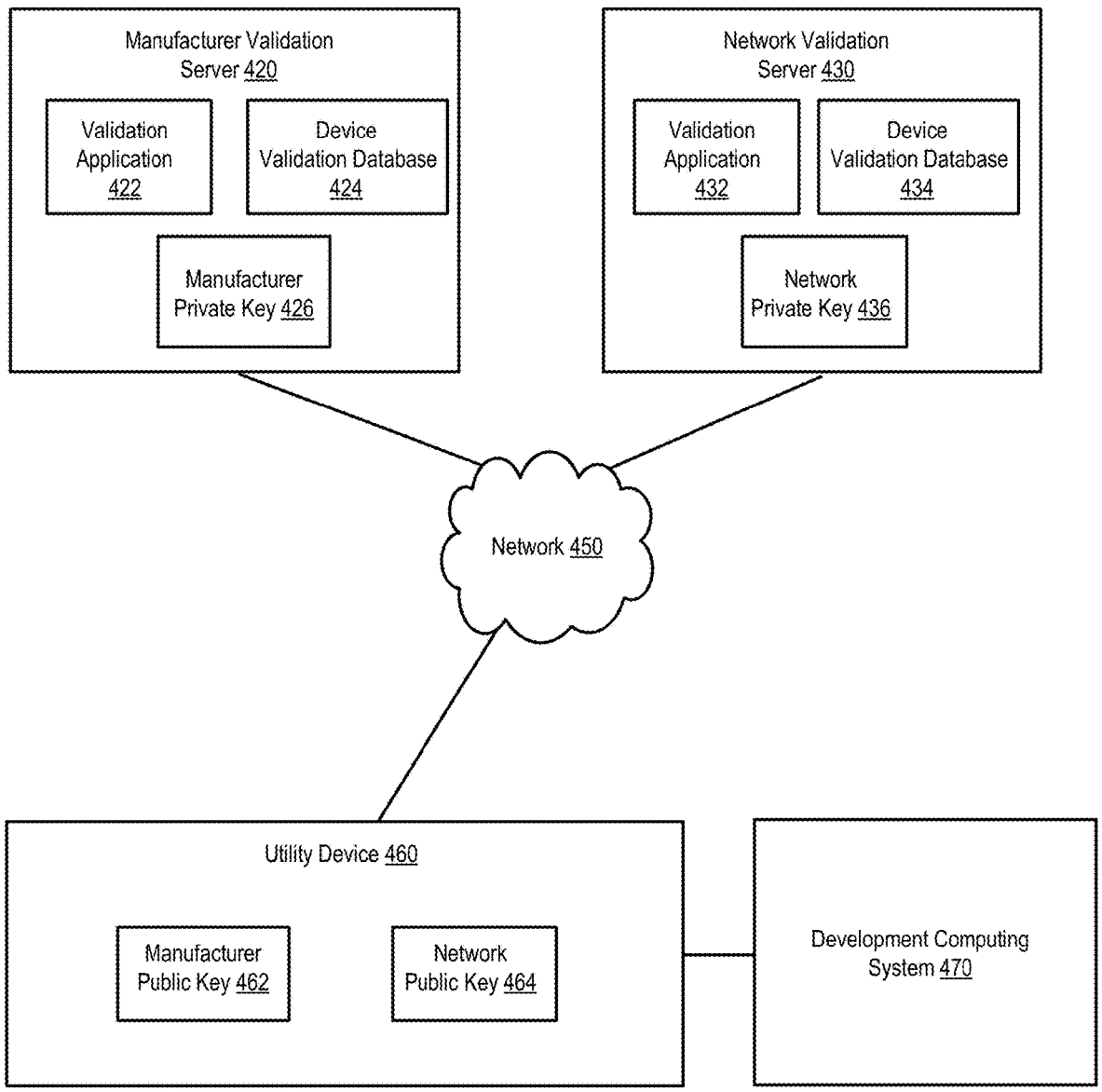
FIG. 4 illustrates a validation environment for a development environment of a utility device, in accordance with an aspect.

Utility device 160*a* or the development tools 132 can request the development certificate. The request for the development certificate can include a unique identifier of the utility device such as a serial number or network device identifier. In some cases, the manufacturer signature and the network signature can be requested separately. As discussed further with respect to FIG. 4, issuing the development certificate can include matching the unique identifier in a database of approved devices.

At block 306 of process 300, the utility device validates the manufacturer signature against a reference manufacturer signature. The reference manufacturer signature can be predetermined and stored in a non-volatile memory of utility device 160*a* prior to deployment of utility device 160*a* or can be obtained, e.g., downloaded, by utility device 160*a*. In an aspect, validation of the utility device can involve public-private key verification of the manufacturer signature, as discussed further with respect to FIG. 4. In another aspect, validation of the utility device can involve comparing a hash of a signature.

As described, the network signature can be validated at block 316. In some cases, both the manufacturer signature and the network signature can be validated at block 306, by the manufacturer, without validation required by the utility device. For example, the manufacturer can approve and validate the utility network operator.

At block 308 of process 300, responsive to validating the manufacturer signature, the utility device transitions to the isolated development mode. If utility device 160*a* is unable to validate the manufacturer signature, then utility device 160*a* can remain in the endpoint mode and/or issue an error message via the development port to the development computing system 130 and/or the utility network.

At block 310 of process 300, the utility device is restricted from joining a network. When in isolated development mode, the utility device is restricted from performing certain actions. For instance, when utility device 160*a* is in the isolated development mode, utility device 160*a* may be restricted from joining network 170. As such, utility device 160*a* cannot communicate with collector 156, backhaul network 154, and head end system 152.

At block 312 of process 300, the utility device receives, via a development port, an application from a development computing system. In isolated development mode, the development port and/or other ports on utility device 160*a* can be activated to facilitate downloading of application software, debugging, tracing, and so forth. In an example, development tools 132 build an application and cause the application program to be downloaded to utility device 160*a*.

At block 314 of process 300, the utility device executes the application on the one or more processors. Continuing the example, utility device 160*a* executes the application. Utility device 160*a* can step through the application and send tracing or debugging information back to development tools 132.

At block 316 of process 300, the utility device validates the network signature against a reference network signature. The reference network signature can be predetermined and stored in a memory of the utility device prior to deployment of the utility device or can be obtained, e.g., downloaded by the utility device. A request to transition from isolated development mode to network testing mode can be caused by an external request such as via development tools 132. When the request is received, utility device 160*a* validates the network signature against a reference network signature. The reference network signature can be stored in non-volatile memory before the utility device is deployed. In an aspect, validation of utility device 160*a* can involve public-private key verification of the network signature, as discussed further with respect to FIG. 4.

At block 318, responsive to validating the network signature of process 300, the utility device transitions to the network testing mode. If utility device 160*a* successfully validates the network signature, then utility device 160*a* transitions to the network testing mode. If utility device 160*a* is unable to validate the network signature, then utility device 160*a* can remain in the isolated development mode and/or issue an error message via the development port to the development computing system 130 and/or the utility network. In some cases, utility device 160*a* can start a timer such that at block 326, the utility device 160*a* can automatically transition back to isolated development mode when the timer has reached a predetermined amount of time.

At block 320 of process 300, when in the network testing mode, the utility device joins the one or more networks. Continuing the example, utility device 160*a* joins network 170 and can communicate with utility devices 160*b-e*, collector 156, backhaul network 154, and head end system 152. Because network access is disabled in isolated development mode, upon transitioning to network testing mode, network access is reinstated by utility device 160*a* and/or the network. For instance, a reboot, reset, or unmasking of the serial number of the utility device is performed.

At block 322 of process 300, the utility device registers with a head end system via the network. Utility device 160*a* registers with head end system 152, thereby enabling testing of the application on a utility network.

At block 324 of process 300, the utility device executes the application on the one or more processors. Continuing the example, utility device 160*a* executes the application and in so doing, can communicate with one or more of utility devices 160*b-e*.

At block 326 of process 300, after a threshold amount of time has lapsed, the utility device transitions to the isolated development mode. Continuing the example, utility device 160*a* determines that a timer has reached the threshold amount of time and transitions back to the isolated development mode.

Transitions between modes can be triggered by other events. For example, a transition can be caused by an external command or input. When in the network testing mode, upon receiving an input from an external development system, the utility device can be configured to transition to the isolated development mode.

FIG. 4 illustrates a validation environment for a development environment of a utility device, in accordance with an aspect. FIG. 4 depicts validation environment 400, which includes one or more of manufacturer validation server 420, network validation server 430, network 450, utility device 460, and development computing system 470. In the example depicted in FIG. 4, manufacturer validation server 420 and network validation server 430 each determine permissions granted to utility device 460 by matching a unique identifier of utility device 460 against one or more databases. The resulting permissions can be reflected in a development certificate that enables one or more of isolated development mode or network testing mode.

Relative to FIG. 1, which depicts a validation server 110, FIG. 4 depicts a more specific example in which a utility device is validated by a manufacturer of the device and by utility network operator of the utility network on which the device operates. For instance, both a manufacturer and a utility network operator can match the unique identifier of utility device 460 in respective databases.

In some cases, the manufacturer also validates the utility network operator. For instance, if the utility network operator is trusted by the manufacturer, then validation of a utility device 460 may only need to occur by the manufacturer validation server 420. In some cases, the utility device may not need to validate the utility. For instance, in many cases, the development may be the utility itself.

Development computing system 470 can facilitate the validation of utility device 460. For example, utility device 460 can receive messages or signatures via development computing system 470 (e.g., via a development port and/or a network). In other cases, utility device 460 can communicate directly with manufacturer validation server 420 and/or network validation server 430 via the utility network (e.g., via a collector and a head end system). Similarly, requests including unique identifiers may be sent via development computing system 470 or via the utility network. Therefore, development computing system 470 may or may not always be used to validate utility devices.

In a more specific example, the manufacturer of utility device 460 validates utility device 460. Manufacturer validation server 420 includes validation application 422, device validation database 424, and manufacturer private key 426. Manufacturer validation server 420 is typically under the control of the manufacturer of the utility device. Manufacturer validation server 420 receives a request from utility device 460 and/or development computing system 470. The request includes one or more unique identifiers such as serial numbers or device network identifiers of utility device 460. The manufacturer validation server 420 matches the unique identifier in the device validation database 424. If validation is successful, for example, if the unique identifier is on an approved list of devices within device validation database 424, then the manufacturer validation server 420 sends a manufacturer signature back to the utility device 460.

In some cases, public-private key encryption is used. For instance, manufacturer validation server 420 creates a message and encrypts the message that includes a manufacturer signature with a private key. Manufacturer validation server 420 sends the message to the utility device 460. In turn, utility device 460 validates the message by decrypting the message with manufacturer public key 462 and comparing the message with a reference manufacturer signature. If the signature matches, then utility device 460 can transition to the isolated development mode.

Additionally or alternatively, the utility that operates utility device 460 validates utility device 460. Network validation server 430 includes validation application 432, utility validation database 434, and utility private key 436. Network validation server 430 is typically under the control of the utility network operator. Network validation server 430 receives a request from utility device 460 and/or development computing system 470. The request includes one or more unique identifiers of utility device 460. The network validation server 430 matches the unique identifier in the utility validation database 434. If validation is successful, for example, if the unique identifier is on an approved list of devices within utility validation database 434, then the network validation server 430 sends a utility signature back to the utility device 460.

In some cases, public-private key encryption is used. For instance, network validation server 430 creates a message and encrypts the message that includes a utility signature with a private key. Network validation server 430 sends the message to the utility device 460. In turn, utility device 460 validates the message by decrypting the message with utility public key 464 and comparing the message with a reference utility signature. If the signature matches, then utility device 460 can transition to the network testing mode.

In some cases, hashing is used. For example, the utility device 460 can verify the manufacturer signature or a message that contains the signature against a reference hash. If a hash of the received manufacturer signature matches a reference hash, then the manufacturer signature is validated. Similarly, the utility device 460 can verify the network signature or a message that contains the signature against a reference hash. If a hash of the received network signature matches a reference hash, then the network signature is validated.

Figure 5:
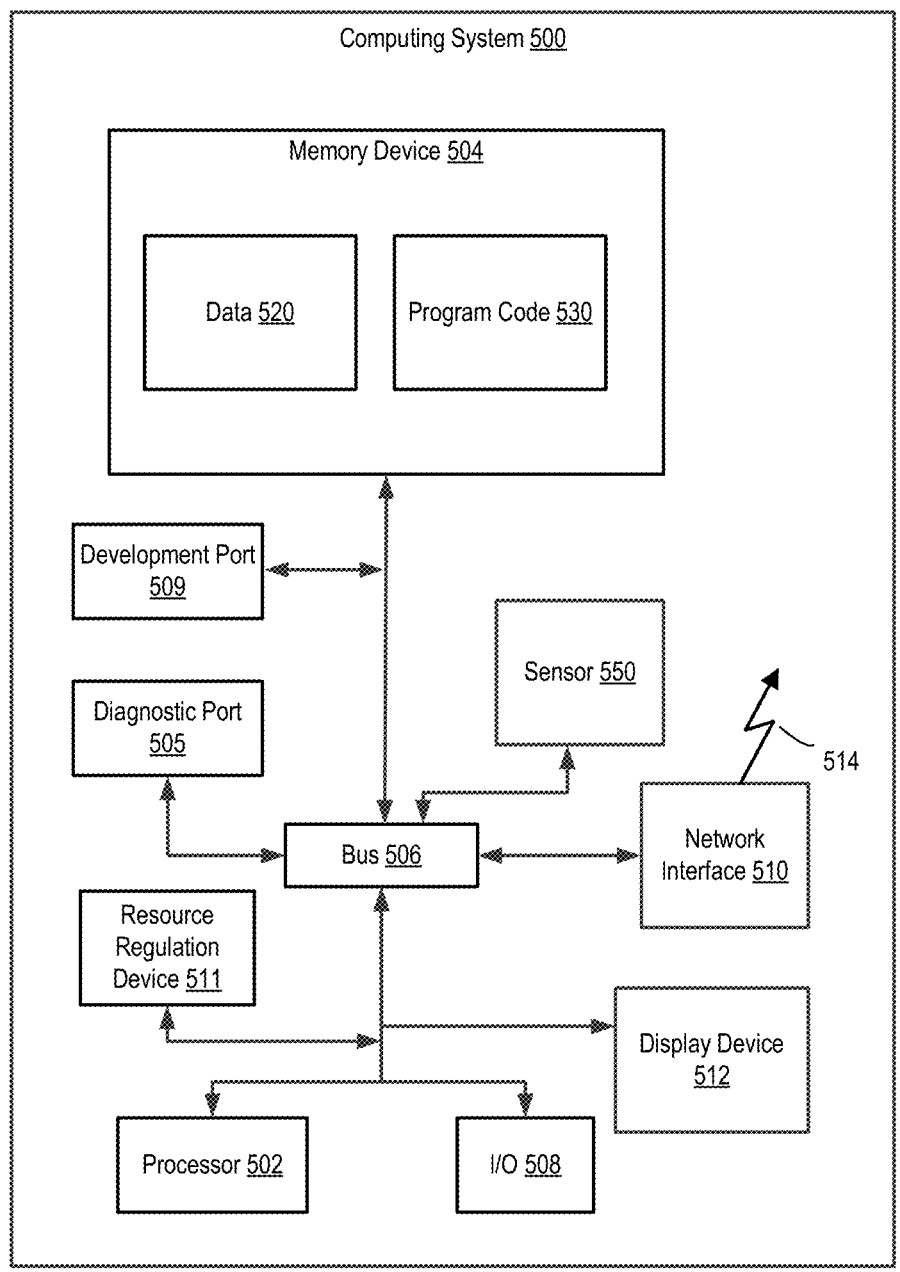
FIG. 5 illustrates an exemplary computing system that can be used in a collector or a metering device, in accordance with an aspect.

FIG. 5 illustrates an exemplary computing system that can be used in a utility device, in accordance with an aspect. Any suitable computing system may be used for performing the operations described herein. The depicted example of a computing system 500 includes a processor 502 communicatively coupled to memory device 504. The processor 502 executes computer-executable program code 530 stored in a memory device 504, accesses data 520 stored in the memory device 504, or both. Program code 530 can include program code of applications developed using the development computing system 130 and/or development tools 132. Data 520 can include data related to the applications.

Examples of the processor 502 include a microprocessor, an application-specific integrated circuit ("ASIC"), a field-programmable gate array ("FPGA"), or any other suitable processing device. The processor 502 can include any number of processing devices or cores, including a single processing device. The functionality of the computing system may be implemented in hardware, software, firmware, or a combination thereof.

The computing system 500 can include a sensor 550 configured to measure parameters relating to the resource of a resource distribution network. For example, in an electricity distribution system, the sensor 550 can measure power consumption, voltage, current, etc. In a gas distribution system, the sensor 550 may measure flow rate. In some aspects, the computing system 500 may include multiple sensors. For example, a computing system 500 may include both a power and a temperature sensor.

The computing system 500 may include a resource regulation device 511. Resource regulation device 511 is configured to control a resource, such as power, water, gas, etc. The resource regulation device 511 may disconnect, reconnect, slow down, speed up, or otherwise adjust the resource.

In some embodiments, the resource regulation device 511 may be remotely located from the computing system 500.

The memory device 504 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an Application Specific Integrated Circuit (ASIC), or any other medium from which a processing device can read instructions. The instructions may include processor-specific instructions generated by a compiler or an interpreter from code written in any suitable computer-programming language, including, for example, C, C++, C#, Visual Basic, Java, or scripting language.

The computing system 500 may also include a number of external or internal devices, such as input or output devices. For example, the computing system 500 is shown with one or more input/output ("I/O") interfaces 508. An I/O interface 508 can receive input from input devices or provide output to output devices. One or more busses 506 are also included in the computing system 500. The bus 506 communicatively couples one or more components of a respective one of the computing system 500.

The computing system 500 may also include a diagnostic port 505. Diagnostic port 505 may be used, for example, by the equipment vendor or the utility company, to determine whether the computing system is operating correctly, or to diagnose and remedy issues, or perform a firmware upgrade of computing system 500.

The computing system 500 may also include a development port 509. Development port 509 facilitates the downloading, execution, and debugging of application software on the computing system 500. For instance, an external development computing system may connect, via the development port 509, to the computing system 500 and download an application to computing system 500. From there, the external development computing system can cause the application to execute, start, or stop. Examples of development port 509 include JTAG ports, serial ports, parallel ports, and network ports. Development port 509 may be disabled by firmware or software.

The computing system 500 executes program code 530 that configures the processor 502 to perform one or more of the operations described herein. For example, the program code 530 causes the processor to perform the operations described in FIG. 3.

The computing system 500 also includes a network interface device 510. The network interface device 510 includes any device or group of devices suitable for establishing a wired or wireless data connection to one or more data networks. The network interface device 510 may be a wireless device and have an antenna 514. The computing system 500 can communicate with one or more other computing devices implementing the computing system or other functionality via a data network using the network interface device 510. Network interface device 510 can be controlled by firmware which can restrict access to one or more networks.

The computing system 500 can also include a display device 512. Display device 512 can be a LCD, LED, touch-screen or other device operable to display information about the computing system 500. For example, information could include an operational status of the computing system, network status, etc.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A utility device comprising:
one or more processors and configured to operate in one or more of: an endpoint mode, an isolated development mode, and a network testing mode, wherein:
when in the endpoint mode, the utility device is configured to:
communicate with other devices on a network;
access a manufacturer signature and a network signature;
validate the manufacturer signature against a reference manufacturer signature; and
responsive to validating the manufacturer signature, transition to the isolated development mode;
when in the isolated development mode, the utility device is restricted from joining the network and is configured to:
receive, via a development port, an application from a development computing system;
execute the application on the one or more processors;
validate the network signature against a reference network signature; and
responsive to validating the network signature, transition to the network testing mode; and
wherein when in the network testing mode, the utility device is configured to:
join the network;
register with a head end system via the network;
execute the application on the one or more processors, wherein the utility device communicates with one or more other utility devices based on the application; and
after a threshold amount of time has lapsed, transition to the isolated development mode.

2. The utility device of claim 1, wherein the manufacturer signature is contained within a message and wherein validating the manufacturer signature against the reference manufacturer signature comprises decrypting the message with a public key of a manufacturer and comparing the message with the reference manufacturer signature.

3. The utility device of claim 1, wherein the utility device comprises a diagnostic port and a Joint Test Action Group (JTAG) port, and wherein when in the isolated development mode, one or more of the diagnostic port and the JTAG port is disabled.

4. The utility device of claim 1, when in the isolated development mode, the utility device is restricted from communicating with the head end system.

5. The utility device of claim 1, wherein the manufacturer signature and the network signature are generated based on matching a unique identifier of the utility device in a database, wherein the unique identifier is a network device identifier of the utility device or a serial number of the utility device.

6. The utility device of claim 1, wherein transitioning to the isolated development mode or transitioning to the network testing mode comprises rebooting or resetting the utility device.

7. The utility device of claim 1, wherein the network signature is contained within a message and wherein validating the network signature against the reference network signature comprises decrypting the message with a public key of a utility network operator and comparing the message with the reference network signature.

8. The utility device of claim 1, wherein when in the network testing mode, upon receiving an input from an external development system, the utility device is configured to transition to the isolated development mode.

9. The utility device of claim 1, wherein validating the manufacturer signature against the reference manufacturer signature comprises creating a hash of the manufacturer signature and comparing the hash with a reference hash.

10. The utility device of claim 1, wherein when in the endpoint mode, the utility device is configured to transmit a unique identifier of the utility device to the development computing system and wherein the one or more of the manufacturer signature and the network signature is received from the development computing system.

11. A method comprising:
transmitting a request for a development certificate, wherein the request comprises a unique identifier of a utility device;
receiving a manufacturer signature and a network signature;
validating the manufacturer signature against a reference manufacturer signature; and
responsive to validating the manufacturer signature, transitioning to an isolated development mode;
wherein when in the isolated development mode:
restricting the utility device from joining a network;
receiving an application from a development computing system;
executing the application;
validating the network signature against a reference network signature; and
responsive to validating the network signature, transitioning to a network testing mode; and
wherein when in the network testing mode:
joining the network and communicating with one or more utility devices connected to the network;
registering with a head end system via the network;
executing the application, wherein the application can communicate with the one or more utility devices; and
after a threshold amount of time has lapsed, transitioning to the isolated development mode.

12. The method of claim 11, wherein:
the manufacturer signature is contained within a first message;
validating the manufacturer signature against the reference manufacturer signature comprises decrypting the first message with a public key of a manufacturer and comparing the first message with the manufacturer signature;
the network signature is contained within a second message; and
wherein validating the network signature against the reference network signature comprises decrypting the second message with a public key of a utility network operator and comparing the second message with the network signature.

13. The method of claim 11, wherein transitioning to the isolated development mode or transitioning to the network testing mode comprises rebooting the utility device.

14. The method of claim 11, wherein validating the network signature against the reference network signature comprises creating a hash of the network signature and comparing the hash with a reference hash.

15. A system comprising:
a development computing system that is configured to:
transmit, to a validation server, a request for a development certificate, wherein the request comprises a unique identifier of a utility device;
receive, from the validation server, the development certificate, wherein the development certificate comprises a network signature and a manufacturer signature; and
transmit the development certificate and an application to the utility device;
wherein the utility device comprises:
one or more processors;
a memory configured to store a reference manufacturer signature and a reference network signature, wherein the utility device is configured to communicate with the development computing system and operate in one or more of: an endpoint mode, an isolated development mode, or a network testing mode, wherein:
when in the endpoint mode, the utility device is configured to:
communicate with other devices on a network;
receive, from the development computing system, the development certificate;
validate the manufacturer signature against the reference manufacturer signature; and
responsive to validating the manufacturer signature, transition to the isolated development mode; and
when in the isolated development mode, the utility device is restricted from joining the network and is configured to:
execute the application on the one or more processors;
validate the network signature against the reference network signature; and
responsive to validating the network signature, transition to the network testing mode.

16. The system of claim 15, wherein the manufacturer signature is contained within a message and wherein validating the manufacturer signature against the reference manufacturer signature comprises decrypting the message with a public key of a manufacturer and comparing the message with the reference manufacturer signature.

17. The system of claim 15, wherein the network signature is contained within a message and wherein validating the network signature against the reference network signature comprises decrypting the message with a public key of a utility network operator and comparing the message with the reference network signature.

18. The system of claim 15, wherein the development computing system is further configured to obtain, from the utility device and via a development port, the unique identifier of the utility device.

19. The system of claim 15, wherein when the utility device is in the isolated development mode, the development computing system is configured to debug the application.

20. The system of claim 15, wherein when the validation server receives the request, the validation server matches the unique identifier in a database of approved devices and generates the development certificate.

* * * * *